United States Patent Office 3,395,617
Patented Aug. 6, 1968

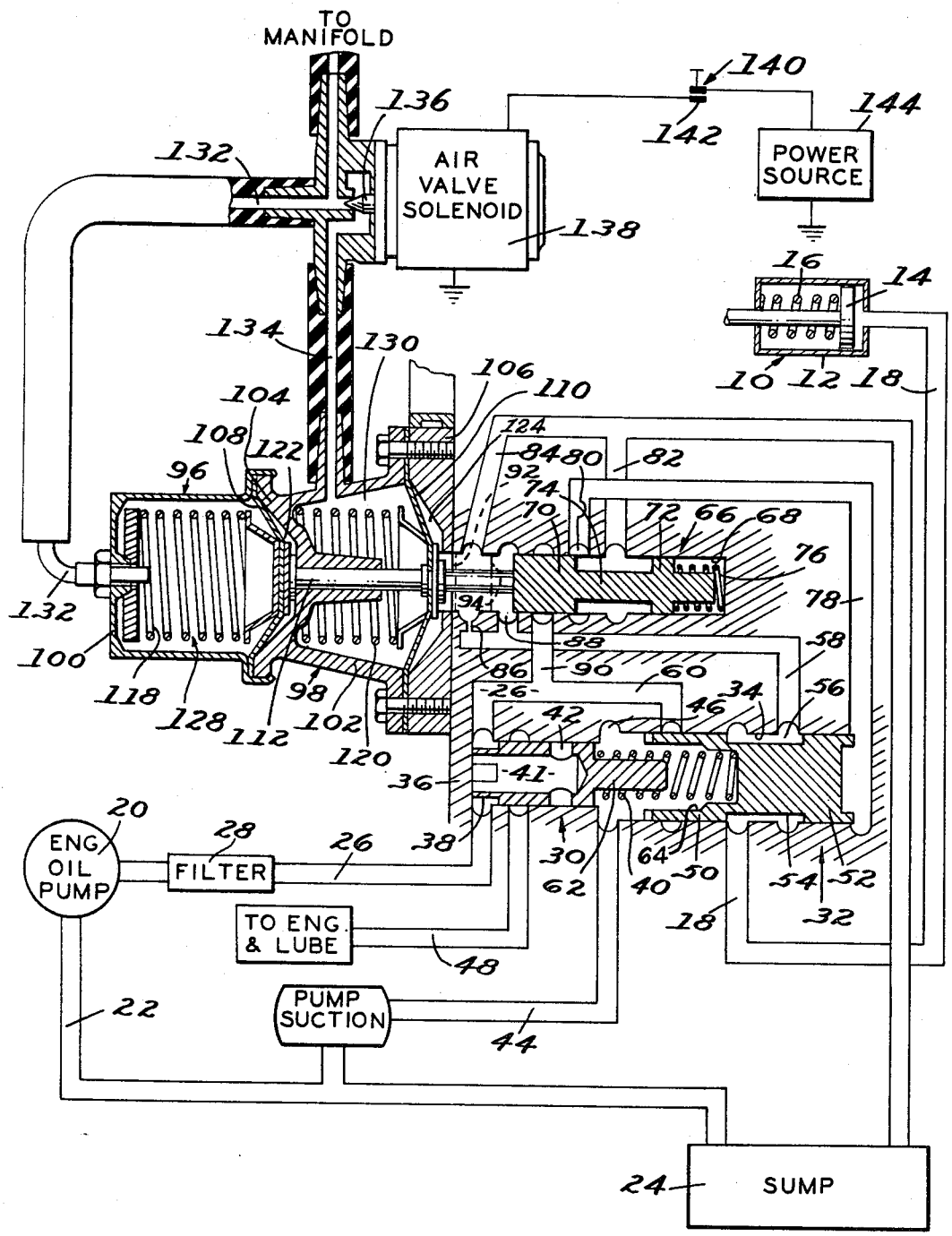

3,395,617
SERVO MOTOR FOR POSITIONING A VALVE AS A FUNCTION OF ENGINE LOAD
Robert E. Kaptur, Birmingham, Mich., assignor to Ford Motor Company, Dearborn, Mich., a corporation of Delaware
Filed Aug. 30, 1965, Ser. No. 483,753
7 Claims. (Cl. 91—443)

ABSTRACT OF THE DISCLOSURE

A semi-automatic fluid pressure control system to disengage a vehicle driveline clutch prior to a gear ratio change, and to control the rate of reengagement of the clutch after the gear ratio change has been made as a function of engine load as indicated by the level of the engine intake manifold vacuum. A manually operated push button, when depressed, subjects a pair of diaphragm type motors to engine intake manifold vacuum to move a pilot valve to a position to permit fluid to then move a shift valve to a position to where fluid can be supplied to the clutch servo to disengage it. Depending upon the engine load at time of reengagement, when the pushbutton is released, the pilot valve will either return to an unrestricted vent position to effect the fast emptying of the clutch servo of fluid, or to a position where the servo apply fluid must vent through a restriction in the line.

The invention relates in general to a fluid pressure control system. More particularly, it relates to a control system that is semi-automatic in operation, and controls the movement of a fluid pressure actuated mechanism, such as, for example, a piston. A preferred use of the invention is as a control for the servo operating the mechanical driveline clutch between a motor vehicle engine and transmission shown and described fully in U.S. 3,322,248.

One of the objects of the invention is to control the rate of movement of a servo piston as a function of the change in torque demand on an engine to coordinate the operation of the servo with the particular engine load conditions.

Another object of the invention is to provide a control system that is simple in construction and operation, is economical to manufacture, and is activated and deactivated at will.

A further object of the invention is to provide a servo fluid pressure control system that uses a conventional engine oil pump as its source of fluid. This eliminates the need for an additional fluid pump in the system, thereby lowering the over-all cost and reducing the additional maintenance that normally is required.

It is also an object of the invention to provide a control system in which the fluid for actuating the servo piston is drained either freely to the sump to provide a quick return movement of the piston, or passes through an orifice in a parallel drain line to provide a slower return movement, the particular drain path being determined by the position of a valve that moves in response to changes in a source of varying vacuum, such as, for example, that is provided by an internal combustion engine intake manifold.

A further object of the invention is to provide a fluid pressure control system to control the rate of movement of a reciprocating servo piston in both directions; the system including a valve acting not only as a pilot or leader valve, but also as a fluid vent control valve, which, when acting as a pilot valve, controls the actuation of the servo in one direction, and, when acting as a fluid vent valve, varies the rate of return movement of the servo as a function of the position of the valve.

A still further object of the invention is to provide a fluid pressure control system for a servo device comprising primarily two valves, one being a combined pilot and fluid vent control valve, the second being a shift valve; the first valve, when acting as a pilot valve, being movable at will to direct fluid under pressure from a source to act on the shift valve and move it to supply actuating fluid under pressure to the servo device; the same valve, when functioning as a fluid vent control, being movable automatically and progressively to restrict or fully open the servo apply line to a sump to vary the rate of return movement of the servo piston.

It is a still further object of the invention to provide a fluid pressure control system of the type described in which the combined pilot and drain valve is moved by a pair of vacuum controlled diaphragm type servos connected in series to the valve, one of which is connected at all times to a source of varying vacuum, such as is provided by an internal combustion engine intake manifold, to move the valve to condition the clutch servo for various rates of drain of fluid from it as a function of the change in vacuum, while the other is normally not subjected to the vacuum, but can be connected to it at will to immediately move the pilot valve to supply fluid to the clutch servo device.

Other objects, features and advantages of the invention will become apparent upon reference to the succeeding, detailed description thereof, and to the drawing in which the figure schematically illustrates a preferred embodiment thereof.

As stated previously, the fluid pressure control system illustrated in the figure is preferably for use with the power operated clutch shown and described in U.S. 3,322,248. The specific details of construction and operation of the clutch and associated transmission described therein are believed to be unnecessary for an understanding of the present invention, and therefore, are not repeated. Suffice it to say, however, that the operation of a motor vehicle driveline mechanical clutch is controlled by a fluid pressure system activated at will by the vehicle driver. The present invention is directed specifically to a fluid pressure control for the clutch servo similar to that device, although it will be clear that it will have use in many installations other than that shown, in which it is desired to control a servo in the manner to be described.

Referring to the figure, the fluid pressure control system is used in conjunction with a servo mechanism 10 that is of a known type. It consists of a cylinder 12 slidably and sealingly receiving a piston 14 therein. The piston is biased towards one end of the cylinder by a spring 16, and is adapted to be moved in the opposite direction by fluid under pressure supplied to a line 18.

The fluid for moving piston 14 in this case is supplied by a conventional engine oil pump 20 that is driven at or proportional to the speed of an internal combustion engine (not shown) to produce an output fluid pressure that changes as a function of the speed. The use of the conventional engine oil pump eliminates the requirement for an additional pump, which reduces the cost of the total assembly, and minimizes maintenance. The pump, therefore, serves two functions; namely, it supplies not only the engine and lubrication requirements, but also the total requirements of the fluid pressure control system for actuating servo piston 14.

The pump may be of a gear or other suitable known type. It has an intake or suction line 22 connected to a fluid sump 24, and discharges fluid through a line 26 past a filter 28. A suitable high pressure relief valve (not shown) usually is also provided to protect the system by returning oil to the intake side of the pump in the event of an unusually high pressure level in line 26.

Discharge line 26 is controlled both by a regulating valve 30 and a shift valve 32. The regulating valve controls the pressure in line 26, and also the flow of oil to the engine and various lubricating stations. The shift valve 32 primarily controls the flow of fluid to or drain of actuating fluid from the servo unit 10 through line 18.

The regulating and shift valves 30 and 32 are mounted in a common stepped diameter bore 34 provided in a valve body 36. The valves are axially aligned, with the regulating valve 30 having a reduced diameter end 38 in pump discharge line 26 to subject the end of the valve at all times to the supply pressure. Regulating valve 30 is biased to a non-regulating or closed position by a spring 40, and has a central bore 41 intersected by a crossbore 42. The crossbore connects the fluid in bore 41 with a pump suction line 44 when the pressure in line 26 reaches a predetermined level. Line 44 also communicates with a chamber 46 between the regulating and shift valves.

The initial movement of regulating valve 30 to the right against the force of spring 40 by the rising fluid pressure in line 26 connects line 26 to an engine oil and lubricating line 48. The valve continues to move to the right unit bore 42 is cracked open to pump suction line 44. At this point, the pressure in bore 41 and line 26 decays until the force of spring 40 is again sufficient to move the valve back to decrease the drain port opening and increase the supply port opening and thereby again increase the pressure in line 26. The valve will soon reach an equilibrium position where the fluid pressure in line 26 just balances the force of spring 40. The valve will thereafter regulate the pressure in line 26 at a particular pressure level for a given engine speed, the fluid meanwhile being supplied continuously to line 48.

Shift valve 32 is of the spool type and is slidably received within the larger diameter portion of bore 34. It has a pair of spaced lands 50 and 52 connected by a neck portion 54 of reduced diameter. The annular chamber 56 formed by the neck portion is, in the poistion shown, connected at its left edge to the servo apply and drain line 18, and at its right edge to a vent or sump line 58. Movement of the valve to the left connects the servo line 18 to an extension 60 of pump discharge line 26.

The regulating and shift valves are separated by and biased to opposite ends of bore 34 by spring 40. It is guided on a stem 62 projecting from regulating valve 30, and is seated at one end against the valve and at its opposite end in a recess 64 in shift valve 32. When shift valve 32 moves to the left, the increased force on spring 40 causes regulating valve 30 to be moved temporarily to the closed position shown until the pressure in line 26 rises to a value sufficient to return it to a regulating position. This permits the entire output of pump 20 to be supplied to servo line 18 as soon as shift valve 32 connects lines 26 and 18 to assure quick stroking of piston 14.

Pump 20 normally must supply all of the requirements of the engine and lubricating stations, as well as the entire control system. Therefore, at low engine speeds, the pump output may be insufficient to provide a fast stroke of the clutch servo. This would delay clutch disengagement, and is undesirable. The described arrangement, however, obviates this by temporarily cutting off the supply of oil to line 48 until the piston has stroked and the pressure builds up in line 26 to a higher value.

The movement of shift valve 32 is controlled by a combination pilot and fluid vent valve 66 that is slidably mounted in a bore 68 in the valve body. This latter valve has essentially three main positions, and is progressively movable between two of the three. The valve is of the spool type, and has a pair of spaced lands 70 and 72 interconnected by a neck portion 74 of reduced diameter. It is biased to the left by a spring 76, and controls the supply or drain of fluid to or from a fluid pressure signal line 78 leading to the right end of shift valve 32. In the dotted line position 94, the annulus 80 formed by the valve neck portion 74 connects signal line 78 to sump 24 through a branch line 82. A parallel branch sump line 84 is connected to the end of the pilot valve bore 68, and through an orifice 86 connects with the shift valve drain line 58. An additional unrestricted drain line 88 is also connected to line 58. Line 90 is a branch of pump line 26.

The three main positions of pilot valve 66 will be explained more fully later during a description of the operation of the control system. Suffice it to say at this point that when the valve is moved to the dotted line position 92, fluid from pump 20 is connected by line 90 to signal line 78 to move shift valve 32 and supply fluid from lines 26, 60 to line 18. When the valve is moved to dotted line position 94, and valve 32 is as shown, valve 66 blocks pump line 90 and connects signal line 78 as well as servo line 18 to sump 24 through line 82 and orifice 86 and drain line 84, respectively. When the valve is in the full line position shown, it blocks line 90 and connects lines 78 and 18 to sump 24 through the unrestricted drain line 88. The rate of return movement of servo piston 14 is thus determined by which of the drain ports 86 or 88 is open.

The pilot valve is moved to its various positions by a pair of vacuum controlled diaphragm type servo units 96 and 98 connected in series. Each of the units has a similar construction and operation. Each unit has essentially a cup-shaped casing 100, 102 closed by a cap or cover 104, 106 of concave shape in cross section. Each has an annular diaphragm 108, 110 sealingly mounted between its cover and casing, and secured to the end of a stem 112 projecting from the pilot valve 66.

The diaphragms 108, 110 divide each of the servo units 96, 98 into two chambers and, are biased towards the right against covers 104 and 106 by springs 118 and 120. The right-hand chamber 122, 124 of each unit is subjected to air at atmospheric pressure through vents, not shown. The left-hand chamber 128, 130 of each unit is subjected to the effect of vacuum through a tube 132 in unit 96, and a tube 134 in unit 98. The opposite ends of the vacuum tubes are commonly connected to any suitable source of varying vacuum; however, in this case, they are preferably connected to the intake manifold of an internal combustion engine so as to be subjected to changes in vacuum with changes in engine loads.

The unit 96 is continuously connected to the source of intake manifold vacuum. The vacuum line 134 for the right-hand unit, however, is normally blocked by an air valve 136; which, when in blocking condition, as shown, admits air to the chamber 130 of unit 98. This balances the forces acting on opposite sides of diaphragm 110 resulting in spring 120 providing the only effective force in unit 98 acting on the diaphragm. Air valve 136 is opened only when it is desired to supply fluid to the servo line 18, as will be described more fully later.

As thus far described, therefore, with high engine vacuum acting in unit 96 alone, indicative of low engine load or low torque demand, the diaphragms 108 and 110 will be positioned to the left of that shown, with the differential between the forces of springs 118 and 120, the vacuum, and spring 76 causing the pilot valve 66 to move to the dotted line position 94. At low engine vacuum, indicative of high engine load and high torque demand, the forces of springs 108 and 110 are sufficiently greater than the forces due to the low vacuum and spring 76 that the pilot valve 66 will be moved to the full line location indicated. Of course, there will be a progressive movement of the pilot valve between these positions since there is a progressive change in vacuum between the maximum and minimum value. When air valve 136 is opened, the combined effect of vacuum acting against both springs 108 and 110, together with the force of spring 76 is sufficient to move valve 66 to the dotted line position 92.

Air valve 136 is formed as the armature of a solenoid 138. When it is de-energized, it permits a spring (not shown) to position valve 136 as shown to block communication between line 134 and vacuum line 132, as described. At the same time, an air vent (not shown) is connected to line 134 so that opposite sides of the diaphragm 110 of unit 98 are essentially balanced so far as air pressure is concerned. When solenoid 138 is energized, valve 136 is moved to the right and vacuum acts on diaphragm 110.

The energization of solenoid 138 in this case is controlled by an operator controlled switch 140, which may be a conventional push-button or other suitable type. Depression of the push-button closes a pair of contacts 142 to complete a circuit from a power source 144 to the solenoid 138 to energize it and thereby move air valve 136 to permit movement of pilot valve 66 in the manner previously described. Release of the push-button deenergizes solenoid 138 and again causes spring 110 to be the only effective force in vacuum unit 98.

While an electrical actuating mechanism is shown and described for moving air valve 136, it will be clear that other suitable selectively operable devices, mechanical, hydraulic or otherwise, could be used to actuate the air valve without departing from the scope of the invention.

In describing the over-all operation, as an example, the servo device 10 is assumed to control the rate of re-engagement of the clutch shown and described U.S. 3,322,248, referred to previously. Thus, when the engine load and torque demand is high, such as during start-up and accelerating conditions of operation, if the vehicle operator wishes to change gear ratios, a fast clutch re-engagement will prevent engine run away. Conversely, when the engine load and torque demand is low, such as during engine idling or cruising, a slow re-engagement of the clutch will provide smooth operation.

The present control system provides both of these functions by automatically controlling the rate of return movement of servo piston 14 by positioning the pilot valve 66 as a function of the changes in engine intake manifold vacuum to either slowly drain the shift valve signal line 78 and servo actuating line 18 through orifice 86 and drain line 84, or quickly through the unrestricted drain 88, while blocking the pump supply line 90.

More particularly, as shown on the drawing, the parts are positioned for a condition wherein the engine is stopped, there is no pressure from pump 20, and the vehicle clutch is engaged. Thus, there is no vacuum in units 96 and 98, and springs 118 and 120 bias the pilot valve 66 to the position shown. The servo apply line 18 will be connected to the sump through drain port 88 and line 84. Pilot signal line 78 will already have drained to the sump through annulus 80 and line 82 when valve 66 was in the engine idle speed position 94 attained just prior to engine shutdown. Assume now the engine is started and is in idle speed or low load condition. Immediately, oil under pressure in line 26 moves the regulating valve 30 against the force of spring 40 to supply oil to line 48 and subsequently begin regulating the pressure in line 26 at a predetermined pressure level. Simultaneously, high vacuum now acting on diaphragm 108 in unit 96, together with the force of pilot valve spring 76 is sufficient to overcome the forces of vacuum unit springs 118 and 120 to position the pilot valve 66 at the dotted line position 94. This blocks the pump supply line 90 and causes a slow drain of any fluid under pressure from servo line 18 through line 58 and orifice 86 to sump 24.

Since at low load operation a smooth re-engagement of the clutch is desired, the unrestricted drain port 88 will be covered by pilot valve 66, forcing any drain of fluid from servo 10 to pass slowly through the orifice 86 on its way to the sump 24. The pilot valve is, therefore, in a position to provide a slow rate of re-engagement of the clutch if it were to be disengaged and re-engaged at this time.

Assume now that the vehicle operator wishes to change a gear ratio. Push button 140 is, therefore, depressed, which closes contacts 142 and energizes the air valve solenoid 138. This retracts air valve 136 and permits intake manifold vacuum to act on diaphragm 110 of vacuum unit 98. The combined effect of the vacuum in units 96 and 98 together with the force of pilot valve spring 76 now overcomes the forces of the servo unit springs 118 and 120 to move the pilot valve to the left to the dotted line position 92. This covers drains 86, 88 and 82, and connects pump supply line 26 to signal line 78. This causes fluid under pressure to act against shift valve 32 and move it to the left to connect servo line 18 to pump supply line branch 60 while simultaneously blocking drain line 58. Fluid under pressure from pump 20, therefore, is immediately applied to the servo unit 10 to stroke it to the left to disengage the vehicle clutch.

Simultaneously, movement of shift valve 32 to the left acting through spring 40 immediately moves regulating valve 30 to the non-regulating position shown. This disconnects pump line 26 and line 48 and, therefore, permits all of the output from pump 20 to be applied to stroke the servo piston 14. As soon as the servo piston 14 has stroked, however, and the pressure rises in servo apply line 18 and pump line 26, the regulating valve 30 will again be moved to its regulating position to again supply oil to the engine and lubricating stations. This will occur when the output pressure has reached approximately 100 p.s.i., for example.

The clutch is now disengaged, and the vehicle operator can move the gearshift lever to change the gear ratio. When the gear ratio change has been completed, and the operator again desires to re-engage the clutch, he releases button 140. This de-energizes the air valve solenoid 138 and again positions air valve 136 to block the application of vacuum to line 134 while simultaneously permitting air to enter the tube. Under the same engine idle (low load) conditions of operation, therefore, air now acts on both sides of diaphragm 110, and the only effective force in unit 98 acting on diaphragm 110 is that due to spring 120. The vacuum acting on diaphragm 108 together with the force of pilot valve spring 76 is sufficient against the forces of springs 118 and 120 to again position the pilot valve 66 in the dotted line position 94. This immediately blocks pump line 90 and connects pilot valve signal line 78 to sump 24 through line 82. With signal line 78 drained, the force of fluid pressure in line 26 acting against regulating valve 30 and the force of spring 40 immediately moves shift valve 32 to the position shown. This disconnects the branch pump output line 60 from servo apply line 18, and connects line 18 to drain line 58. The servo thus drains slowly through orifice 86 and slowly permits the spring 16 to re-engage the clutch in a smooth manner.

In the engine load condition or torque demand changes, the pilot valve position will be adjusted automatically so that it will be in a position providing the desired rate of re-engagement of the clutch. More specifically, assume that the engine operating conditions change from the low load and low torque demand conditions previously described, that the clutch is engaged, solenoid 138 de-energized, and that now the vehicle is either being accelerated or started from rest with a high engine load. The vacuum in the intake manifold would, therefore, be low. This would permit the spring 118 in vacuum unit 96 to apply a high force against diaphragm 108 and move it against the cover member 104. This causes pilot valve 66 to move to the full line position shown uncovering the drain port 88. Thus, if the servo unit were to be activated at this time to disengage the clutch, the pilot valve 66, when the clutch is re-engaged, would automatically return to the position just described to provide a fast rate of re-engagement of the clutch, and one that corresponds to the high load condition of engine operation.

More specifically, actuation of solenoid 138 by closing switch 140 again applies vacuum to unit 98. Even though the vacuum is low, the combined effect of the vacuum acting on both diaphragms 108 and 110 is sufficient to immediately move pilot valve 66 to the left to position 92. This supplies fluid under pressure to signal line 78 and moves shift valve 32 to the left to temporarily seat the regulating valve 30 and simultaneously apply pump pressure to the servo piston 14. When the shift has been completed, release of button 140 de-energizes solenoid 138 and again produces an air balanced condition in unit 98. Since only low vacuum is acting on diaphragm 108 in unit 96, pilot valve 66 will immediately move to the full line position shown, causing a fast drain of fluid from servo apply 18. The remaining details of operation are the same as for low load condition of operation. Of course, it will be clear that the changes in vacuum between the maximum and minimum values will variably move the pilot valve between the full line position shown and position 94, thereby variably and progressively controlling the rate of clutch re-engagement.

From the above, it will be seen that the control system of the invention automatically provides for a control of the rate of movement of the servo in one direction as a function of the changes in a source of varying vacuum, and that the pilot valve automatically moves to a position causing a fast stroke of the servo unit in the opposite direction at all times upon activation of an operator controlled switch.

While the invention has been illustrated in its preferred embodiment, it will be clear to those skilled in the arts to which the invention pertains that many changes and modifications may be made thereto without departing from the scope of the invention.

I claim:

1. A fluid pressure control system, comprising, in combination, an actuatable means movable by fluid under pressure in one direction from one position to a second position, means urging said actuatable means in a return direction to said one position, a source of fluid under pressure, a supply line connecting said source and actuatable means for moving it to its second position, a fluid pressure signal line connected to said source, and flow control means associated with said lines for controlling the flow therethrough, said control means including a multi-position first valve movable between positions controlling the flow of fluid through said signal line, said control means also including a second multi-position valve movable by fluid under pressure in said signal line admitted past said first valve from a position blocking flow through said supply line to a second position admitting fluid to said actuatable means, and means to move said first valve to its various positions, a fluid sump, a fluid vent line connected from said supply line to said sump through at least one of said valves, said latter one valve in one position operatively effecting the blocking of the supply of fluid to one of said supply and signal lines while unblocking said vent line and being variably movable to a plurality of vent line flow blocking positions variably restricting the flow through said vent line thereby controlling the return movement of said actuatable means.

2. A fluid pressure control system, comprising, in combination, an actuatable means movable by fluid under pressure in one direction from one position to a second position, means urging said actuatable means in a return direction to said one position, a source of fluid under pressure, a supply line connecting said source and actuatable means for moving it to its second position, a fluid pressure signal line connected to said source, and flow control means associated with said lines for controlling the flow therethrough, said control means including a multi-position first valve movable between positions controlling the flow of fluid through said signal line, said control means also including a second multi-position valve movable by fluid under pressure in said signal line admitted past said first valve from a position blocking flow through said supply line to a second position admitting fluid to said actuatable means, and means to move said first valve to its various positions, a fluid sump, a fluid vent line connected from said supply line to said sump through at least one of said valves, said latter one valve in one position effecting an opening of said supply line to said source and a closing of said vent line, and in a second position effecting a closing of said supply line to said source and opening of it to said vent line, and in a third position effecting a closing of said supply line to said source and a restricting of said vent line, the control of said vent line controlling the return movement of said actuatable means.

3. A fluid pressure control system as in claim 1, wherein said means for moving said first valve includes a source of varying vacuum, vacuum responsive means operably connected to said first valve and said vacuum source and movable in response to changes in vacuum acting thereon to move said first valve to a plurality of positions controlling flow of fluid in said system, and selectively operable means operably connected to said first valve to effect its movement to a position other than said plurality of positions.

4. A fluid pressure control system, comprising, in combination, an actuatable means movable by fluid under pressure in one direction from one position to a second position, means urging said actuatable means in a return direction to said one position, a source of fluid under pressure, a supply line connecting said source and actuatable means for moving it to its second position, a fluid pressure signal line connected to said source, and flow control means associated with said lines for controlling the flow therethrough, said control means including a multi-position first valve biased to a signal line flow blocking position and movable to a position permitting flow of fluid through said signal line, said control means also including a second multi-position valve biased to a supply line blocking position and movable by fluid under pressure in said signal line admitted past said first valve to a second position admitting fluid to said actuatable means, and means to move said first valve to its various positions, a fluid sump, a fluid vent line connected from said sump through said first and second valves to said supply line, said first valve in one position opening said signal line to said source and blocking said vent line, and in a second position connecting said signal line to said vent line, and in a third position connecting said signal line to a restricted vent line, the movement of said valve between said second and third positions controlling the return movement of said actuatable means.

5. A control system as in claim 4, wherein said means for moving said first valve includes a pair of vacuum controlled servos connected in series to said first valve for moving said valve to various control positions as a function of changes in vacuum, a source of varying vacuum connected to said servos, and selectively operable distributor means for admitting or blocking the application of vacuum to one of said servos to control the movement of said first valve to one of said three positions.

6. A fluid pressure control system, comprising, in combination, an actuatable means movable by fluid under pressure in one direction from one position to a second position, means urging said actuatable means in a return direction to said one position, a source of fluid under pressure, a fluid supply/return line connected to said actuatable means, a fluid sump, a plurality of conduit means connecting said source and sump to said supply line, a reversing valve across said conduit means movable between positions alternately connecting said supply line to said source or sump, a fluid pressure signal line connected to said source and to portion of said valve moving said valve to one position, means biasing said valve to its alternate position, a pilot valve controlling flow through said signal line and the conduit means connected to said sump and movable between positions alternately connecting said source to said signal line while blocking said sump conduit means or connecting said sump conduit means to said signal line while blocking fluid from said source to said signal line, said sump conduit means having a flow restriction means therein and a line bypassing said restriction means, the movement of said pilot valve to one position connecting said source and signal line to move said reversing valve to connect said source and supply line while blocking the sump conduit means, and to a second position connecting said signal line and supply line to the sump through said restriction means while blocking the fluid from said source to control the return movement of said actuatable means at one rate, and to a third position connecting said supply and signal lines to the sump through said fluid bypass while blocking the fluid from said source to control the return movement of said actuatable means at a different rate, and means moving said pilot valve to its various positions.

7. A fluid pressure control system, comprising, in combination, an actuatable means movable by fluid under pressure in one direction from one position to a second position, means urging said actuatable means in a return direction to said one position, a source of fluid under pressure, a fluid supply/return line connected to said actuatable means, a fluid sump, a plurality of conduit means connecting said source and sump to said supply line, a reversing valve across said conduit means movable between positions alternatively connecting said supply line to said source or sump, a fluid pressure signal line alternately connected to said source or sump and to a portion of said valve moving said valve to one position, means biasing said valve to its alternate position, a pilot valve across said signal line and the conduit means connected to said sump movable between positions alternately connecting said source to said signal line while blocking said sump conduit means or connecting said sump conduit means to said signal line while blocking fluid from said source to said signal line, said sump conduit means having a flow restriction means therein and a line bypassing said restriction means, the movement of said pilot valve to one position connecting said source and signal line to move said reversing valve to connect said source and supply line while blocking the sump conduit means, and to a second position connecting said signal line and supply line to the sump through said restriction means while blocking flow from said source to control the return movement of said actuatable means at one rate, and to a third position connecting said supply and signal lines to the sump through said fluid bypass while blocking flow from said source to control the return movement of said actuatable means at a different rate, and means moving said pilot valve to its various positions, said latter means including a vacuum controlled servo unit connected to said pilot valve moving said latter valve between the second and third positions in response to changes in vacuum thereon, a source of varying vacuum connected at all times to said servo unit, and additional selectively operable means moving said pilot valve to its first position.

References Cited
UNITED STATES PATENTS

| | | | |
|---|---|---|---|
| 2,940,263 | 6/1960 | Cudohufsky | 91—447 |
| 2,972,337 | 2/1961 | Coggeshall et al. | 91—461 |
| 3,030,929 | 4/1962 | Hipp | 91—461 |
| 3,245,502 | 4/1966 | Randal | 192—109 |
| 3,263,782 | 8/1966 | Smirl et al. | 192—85 |

MARTIN P. SCHWADRON, *Primary Examiner.*

B. L. ADAMS, *Assistant Examiner.*